US005680467A

United States Patent [19]

Hansen

[11] Patent Number: 5,680,467

[45] Date of Patent: Oct. 21, 1997

[54] HEARING AID COMPENSATING FOR ACOUSTIC FEEDBACK

[75] Inventor: Roy Skovgaard Hansen, Dragør, Denmark

[73] Assignee: GN Danavox A/S, Taastrup, Denmark

[21] Appl. No.: 733,222

[22] Filed: Oct. 17, 1996

Related U.S. Application Data

[63] Continuation of Ser. No. 302,813, Sep. 13, 1994.

[30] Foreign Application Priority Data

Mar. 31, 1992 [DK] Denmark .................................. 432/92

[51] Int. Cl.[6] .......................... H04R 25/00; H04B 15/00

[52] U.S. Cl. .......................... 381/68.2; 381/68; 381/71; 381/83; 381/73

[58] Field of Search .......................... 381/23.1, 68, 68.2, 381/68.4, 71, 83, 93, 94; 333/166, 174

[56] References Cited

U.S. PATENT DOCUMENTS 4,783,818 11/1988 Graupe et al. .
4,791,390 12/1988 Harris et al. .......................... 333/166
5,016,280 5/1991 Engebretson et al. .
5,259,033 11/1993 Goodings et al. .................... 381/68.2

FOREIGN PATENT DOCUMENTS 0250679 1/1988 European Pat. Off. .
0415677 3/1991 European Pat. Off. .
90/05436 5/1990 WIPO .

*Primary Examiner*—Huyen D. Le
*Attorney, Agent, or Firm*—Merchant, Gould, Smith, Edell, Welter & Schmidt, P.A.

[57] ABSTRACT

A hearing aid with digital, electronic compensation for acoustic feedback includes a microphone, a preamplifier, a digital compensation circuit and output amplifier and a transducer. The digital compensation circuit includes a noise generator for the insertion of noise, and an adjustable, digital filter for the adaptation of the feedback signal. The adaptation takes place using a correlation circuit which includes a digital circuit to carry out a statistical evaluation of the filter coefficients in the correlation circuit, and changes the feedback function in accordance with this evaluation.

4 Claims, 4 Drawing Sheets

HEARING AID COMPENSATING FOR ACOUSTIC FEEDBACK

This is a Continuation of application Ser. No. 08/302,813, filed as PCT/DK93/00106 Mar. 23, 1993.

TECHNICAL FIELD

The invention concerns a digital hearing aid as diclosed in more detail in the preamble to claim 1.

A hearing aid of this kind with digital suppression of or compensation for acoustic feedback is known from the applicant's earlier European patent application no. 90309342.5 (publication no. EP-A2-0415677). The present application is related to this European application, which was filed on Aug. 24th 1990, and everything disclosed in said patent application therefore forms part of the present application with this reference.

It is known from EP-A2-0,415,677 to monitor the digital filter and change the coefficients when changes occur in the acoustic feedback path, in that a digital circuit monitors and controls the updating of the coefficients in the filter. Updating of filter coefficients can be carried out according to two different functions, one function being quicker than the other. The selection of the function is controlled by the level of the filtered signal measured by a discriminator.

Such a hearing aid has in practice proved to function as intended. In order for the hearing aid still not to oscillate, the compensation, which is carried out by updating the coefficients in a digital filter in a feedback circuit, is effected by means of an algorithm which takes into account the error in the filter, i.e. the difference between the filter's actual setting and the desired setting. Such a hearing aid will not always be quick enough to adapt to sudden changes in the acoustic feedback path, even though it is still able to compensate for the acoustic feedback which arises. The lack of speed in the adaptation function can result in undesired acoustic signals which can be heard by the user of the hearing aid. Therefore, it is very important that the change over is carried out on the basis of a precise evaluation of the actual conditions.

ADVANTAGES OF THE INVENTION

The object of the present invention is to increase the adaptation speed without hereby giving rise to any inconvenience for the user of the hearing aid. In order to be quite certain that the hearing aid does not begin to oscillate, the algorithm which takes care of the updating of the coefficients in the digital filter in the compensation circuit must take into consideration that the filter error depends on the number of coefficients, signal/noise ratio, input level, volume, and on the degree of peak clipping in the limiter circuit. Such an embracing algorithm will not be particularly fast in adapting itself to changes in the acoustic feedback path, but on the other hand it will provide a reliable and precise adjustment of the filter under stationary conditions in the feedback path.

By configuring the hearing aid according to the invention as characterized in claim 1, the updating of the coefficients in the filter takes place following a choice between a number of algorithms, so that the hearing aid selects between alternative algorithms to the basic algorithm when a significant change occurs in the acoustic feedback path which is ascertained by a statistical evaluation of the filter coefficients. If, for example, the change is such that a greater acoustic feedback occurs, the hearing aid immediately selects an algorithm with a greater speed of adaptation. This happens, for example, by adding more noise and/or increasing the adaptation speed in excess of what is prescribed by the basic algorithm. The quick condition lasts until the circuit ascertains that the filter coefficients are stable again, after which the circuit automatically switches back to the basic algorithm for continuous adjustment of the electronic compensation.

The proposed method of updating the coefficients in the filter according to the invention has the effect that the dispersion of the individual coefficients only depends on the volume and the number of coefficients in the filter. Accordingly, the filter will always be stable irrespective of the input it is introduced to, when the filter to be modulated is constant. This is the statistical evaluation of the filter coefficients.

In order to follow this change of the surroundings, the updating speed of the filter can be increased by adding more measuring noise to the output of the hearing aid and by allowing greater deviation of the coefficients.

Each time the deviation of the filter exceeds the fixed limit, a new copy of the coefficients is saved. If the limit has not been exceeded for a period of time calculated on the basis of the given updating speed, it may be assumed that the surroundings have reached a stable condition again after which a shift back to the basic algorithm is effected.

With some hearing aids it is sufficient to have two algorithms, a basic and a quick algorithm, while with other hearing aids use is made of a number of algorithms with different speeds of adaptation and possibly different adaptive functions, these being controlled by the digital circuit which monitors the coefficients in the digital filter.

A hearing aid with such a coupling between a general algorithm and a quick or quicker algorithm is able to react considerably more quickly to a significant change in the acoustic feedback path, as compared with an aid which functions solely with the general algorithm, even though with the hearing aid according to the invention there is introduced, for example, 6 dB less noise in the general algorithm.

The measurement of changes which are so great that the circuit shifts from the general algorithm to an alternative, e.g. a quicker algorithm, is effected preferably by a statistical monitoring of the coefficients in the digital filter. For example, a significant change occurs in the acoustic feedback path when one or more coefficients during the change comes out in excess of 4×the calculated standard deviation.

THE DRAWING

The invention will now be described in more detail with reference to the drawing, in that FIG. 1 shows a block diagram of a hearing aid according to the invention, FIG. 2 shows a more detailed presentation of the block diagram in FIG. 1, FIG. 3 shows a block diagram of the adaptation part of the hearing aid in FIGS. 1 and 2, FIGS. 4 and 5 show block diagrams of pseudo-random-binary generators and a variant hereof, and FIG. 6 shows a block diagram of the noise level control circuit in the hearing aid in FIG. 2.

DESCRIPTION OF THE PREFERRED EMBODIMENT

Figure 1:
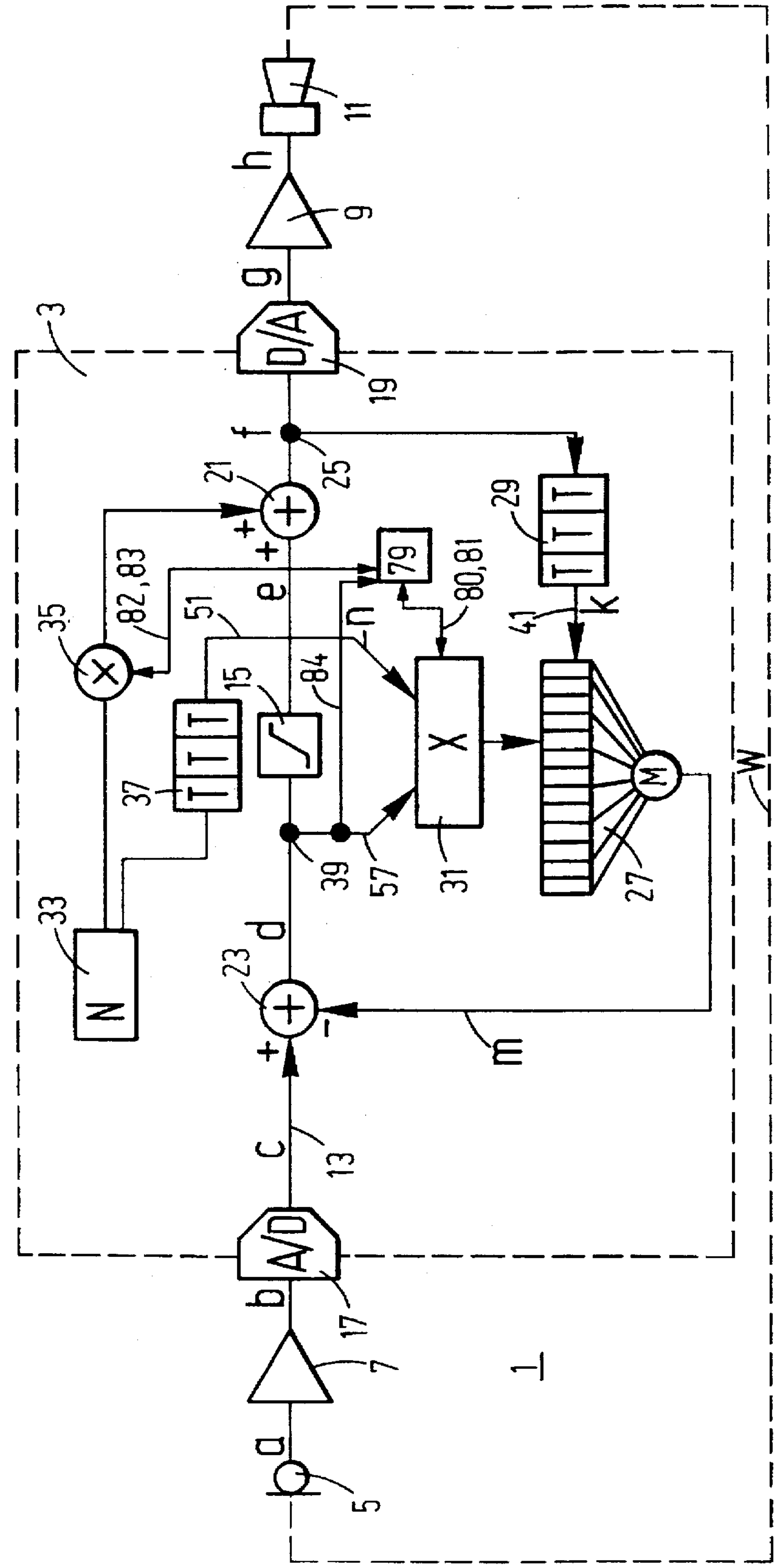

The following description of the preferred embodiment of the invention, with reference to FIGS. 1 to 6 of the drawing, is only an example of how the invention can be utilized in practice. In all of the figures of the drawing, the same reference designations are used for identical components or circuits etc.

In FIG. 1 is shown a hearing aid comprising a sound receiver, for example in the form of a microphone 5, a preamplifier 7, a digital adaptation circuit 3, an output amplifier 9 and a sound reproducer 11, for example a miniature electro-acoustic transducer.

The preamplifier 7 is of a commonly-known type, for example of the type known from the applicant's earlier European application no. 90309342.5, and the output amplifier is similarly of a commonly-known type, for example corresponding to the output amplifier which is used in the hearing aid in the applicant's earlier European application no. 90309342.5.

The digital adaptation circuit 3 is shown within the stippled frame in the connection 13 between the preamplifier 17 and the output amplifier 9. However, there is nothing to prevent the circuit 3 from being a mixed analogue and digital circuit, but in the preferred embodiment a purely digital circuit is used.

The input to the digital adaptive circuit 3 comprises an A/D converter 17 and the output from the circuit comprises a D/A converter 19. In the circuit c, d, e and f between the input 17 and the output 19 there is a digital limiter circuit 15 of a known kind, for example as known from the applicant's earlier European application no. 90309342.5. The function of the limiter circuit 15 is to prevent the electrical signal from reaching a level of amplitude which exceeds the linearity limits of the output amplifier 9 and the transducer 11, and as explained in said European application.

A digital summing circuit 21 is inserted in the path between the limiter circuit 15 and the D/A converter 19. The summing circuit 21 serves as a place for the introduction of a noise signal N as explained later. A digital subtraction circuit 23 is inserted in the path between the A/D converter 17 and the limiter circuit 15. The subtraction circuit 23 comprises means for the introduction of electrical feedback, as will also be described later.

The normal signal path for a desired signal from the microphone to the transducer 11 is the direct circuit path a-b-c-d-e-f-g-h as shown in FIG. 1. It should be noted that the electrical path a, b, g and h is arranged for analogue signals and thus normally comprises only a single conductor, while the electrical signal path c, d, e and f is arranged for digital signals and will thus comprise a number of parallel conductors, for example 8 or 12 conductors, depending on the bit number from the A/D converter 17.

Electrical feedback is derived from a tap 25 in the area f in the digital signal path between the summing circuit 21 and the D/A converter 19, which means that the electrical, digital feedback signal comprises a noise-level component. The feedback signal is led through an adaptive filter 27 which is shown as a "limited impulse response filter", a so-called FIR filter (Finite—Impulse—Response filter), and after passing through this filter, the feedback signal is fed to the digital subtraction circuit 23 via a digital signal path m. Preferably, the digital signal from the tap is fed via a delay circuit 29 before being fed to the FIR filter 27 as a digital signal 41 via the digital lead k. The delay in the delay circuit 29 is of the same order as the minimum acoustic path length between the transducer 11 and the microphone 5, and must introduce a delay which corresponds hereto. It is not necessary to introduce such a delay by means of the delay circuit 29, but significant redundancy in filters and correlation circuit is hereby avoided, so that the overall circuit is simplified. The impulse response from the filter 27 is continuously adjusted, controlled by coefficients from a correlation circuit 31. The correlation circuit 31 constantly seeks for correlation between the inserted digital noise and any noise component in the residual signal in the connection d after the digital subtraction circuit 23. The inserted noise signal N is generated from a noise source 33 and is introduced via the digital summing circuit 21 after level adjustment in the regulation circuit 35. The noise signal is also coupled to a reference input on the correlation circuit 31 via a second delay circuit 37, which also introduces a delay of the same order as the minimum acoustic path length between the transducer 11 and the microphone 5 via a signal path n. The residual signal on the lead d constitutes the input signal on the correlation circuit 31, in that the signal is fed hereto from a point 39 on the lead d and by means of the digital lead 57.

In addition to the above, there is inserted a circuit 79 in the form of an algorithm control circuit which determines the algorithm in accordance with which the correlation circuit 31 must send coefficients further to the filter 27, in that the algorithm control circuit 79, via the digital connections 80, 81, constantly monitors and controls the correlation circuit 31. The algorithm control circuit 79 also controls the supply of digital noise from the noise generator 33 by regulating the level in the circuit 35 via the lead 82. Moreover, the residual signal is fetched from the tap 39 via the lead 84, the amplitude of the noise signal is fetched via the lead 83, see FIG. 2, and the volume signal is fetched via the lead 86, which is explained later.

The electrical output signal from point 25 is thus fed via the delay circuit 29 to the adaptive filter 27 (FIR), and to the subtraction circuit 23 as the final feedback signal, where the subtraction from the input signal is carried out. In an optimum situation, the feedback signal will correspond completely to an undesired acoustic feedback signal which, via a feedback path w, is conducted from the transducer 11 to the microphone 5. If the feedback signal and the signal from the acoustic feedback are completely identical, there will be no residual signal from the acoustic feedback on the lead d, the reason being that the digital feedback signal from the lead m will completely cancel out the acoustic feedback signal.

In order for the filter 27 to be able to be set correctly, the noise signal N is added to the output signal via the summing circuit 21 after level regulation in the circuit 35. The noise signal will thus exist in both the inner feedback circuit 3 and the outer acoustic feedback path w. The noise signal will thus pass the D/A converter 19 and, via the amplifier 9, reach the transducer 11 and be converted to an acoustic signal which is superimposed on the desired signal. The level of the noise signal is set in such a manner that it is of no inconvenience to the user of the hearing aid.

In practice, the two said signals do not cancel each other out completely, and a small amount of noise and other feedback signals are to be found in the residual signal on the digital lead d, and these are detected by the correlation circuit 31 which constantly looks for correlation between the residual signal and the delayed version of the noise signal n. The output signal from the correlation circuit 31 is an expression for the residual signal, and is used for controlling the filter 27 by changing the filter coefficients. The adaptation is thus arranged that the filter 27 is constantly adjusted so that the feedback system seeks towards a situation in which the noise is cancelled. Physical changes in the environment for the hearing aid and its user, and limitations in the algorithm which controls the system, give rise to the result that complete cancellation cannot always be achieved, which is why the algorithm control circuit 79 is inserted.

But first the inserted noise signal must be explained. Normally, there is used a noise signal N with a certain spectral characteristic, i.e. with constant level over the whole of the frequency range over which the hearing aid is arranged to operate, a so-called white noise signal. Here, pseudo-random-binary-sequence noise signals with suitable bit repetition can be used. These noise signals can easily be generated, for example by using the circuit shown in FIG. 4, i.e. by using a clocked shift register 103 with multiple feedback via an exclusive OR-gate 105. Such a circuit will generate signals with a pattern which is repeated after every $2^M-1$ bits, where M is the number of stages in the generator. Satisfactory noise signals are achieved with a repetition length from 127 samples to 32,767 samples, i.e. by using circuits with 7 to 15 stages.

Figure 4:
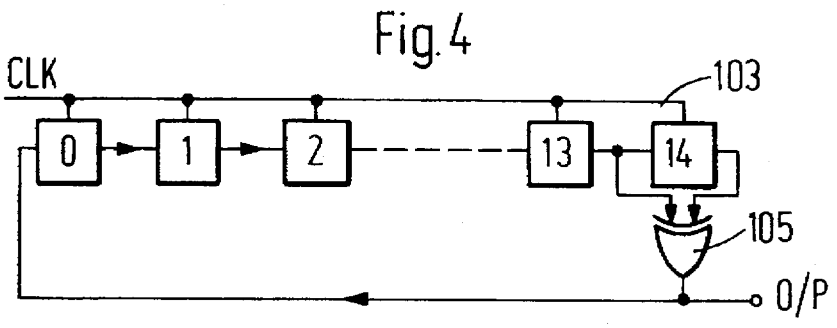
Figure 5:
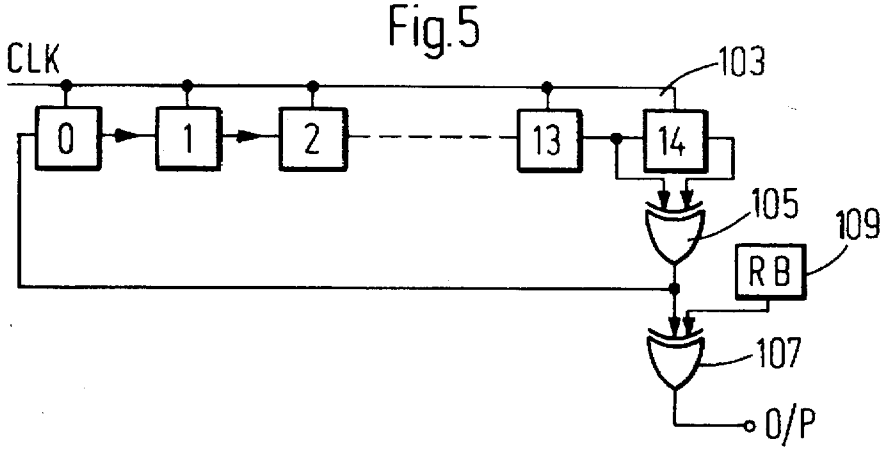

The choice of noise signal is based on the desire to have a low auto-correlation over any span of time which is of the same magnitude as the time constant of the adaptation circuit, i.e. typically about one second. If the acoustic feedback signal is periodic, for example a sine-wave signal, stable cancellation is not always achieved, in that in such situations the adaptation circuit can wander, which can result in signals which can be heard by the user. Such effects can be eliminated by an increased randomisation in the noise generator. This is shown in FIG. 5, where the output signal from the noise generator circuit 103, 105 is fed to the one input of a further exclusive OR-gate 107, the other input of which is connected to a source of random signals RB in a randomisation generator 109, which for example can be the least significant digital output gate of the A/D converter 17 in the hearing aid. This has a considerably increased effect with regard to the randomising of the bit sequence, and thus eliminates possible wandering. It can be mentioned that the noise generator circuits shown in FIGS. 4 and 5 are of the same type as in the applicant's earlier European application no. 90309342.5.

Figure 2:
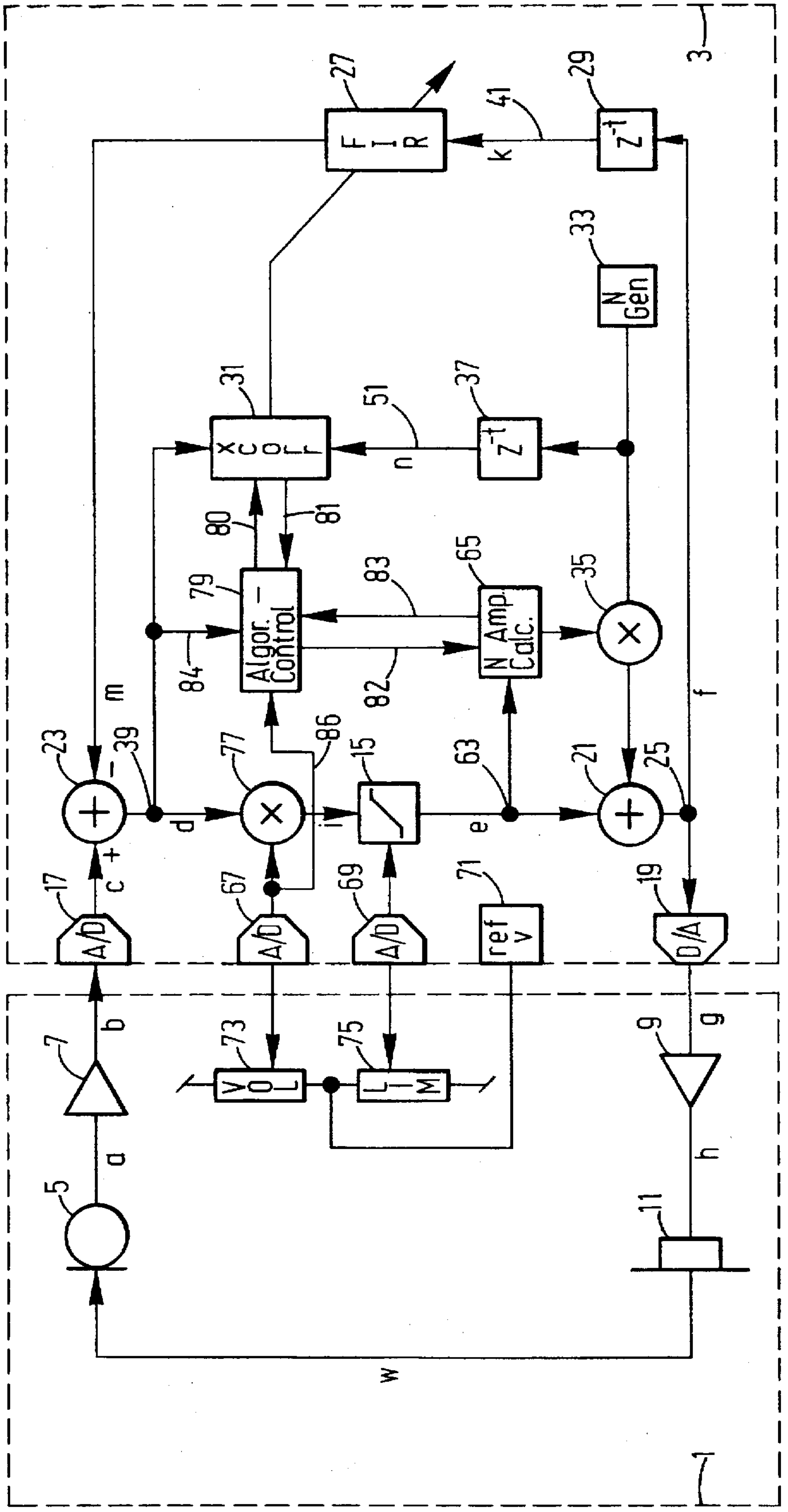

Further details of a hearing aid according to the invention shown in FIG. 2 of the drawing, and comprising a user-operated volume control 73 and a similarly user-operated adjustment rheostat 75 for the setting of the level in the limiter circuit 15.

In a hearing aid there is normally a volume control which can be operated by the user. This can be placed in the microphone amplifier or in front of the output amplifier, but in both cases the adaptive filter 27 must change its coefficients when the setting of the volume control is changed. In FIG. 2 is shown a multiplication amplifier 77 between the tap 39 and the amplitude limiting circuit 15.

The amplifier 77 is coupled to the volume control 73 via an A/D converter 67, and from the input to the amplifier 77 there is a digital lead 86 for the algorithm control circuit 79 so that this circuit can scan the volume setting.

The amplitude limiter circuit 15 can also be user-operated, in that the potentiometer 75 is coupled to the amplifier 15 via an A/D converter 69. It is desirable that the limiter 15 is user-operated, since the limiting circuit determines the maximum sound-pressure level which can be applied to the user's ear. The output level can be reduced without reducing the gain of the amplifier, which is of significance. The maximum positive and negative sound pressure is thus regulated by the user with the potentiometer 75. FIG. 2 also shows that the two potentiometers 73 and 75 are connected to a common source of reference voltage 71.

As mentioned above, the level of the inserted noise can be regulated to obtain optimum adaptation. In FIG. 2 it is seen that the amplifier 35 after the noise generator 33 is controlled by a computation unit 65, for example in the form of a single-stage recursive filter, for example shown in FIG. 6. The unit 65 is coupled via the two-way connection 82, 83 to the algorithm control unit 79, so that the unit 79 can fetch the noise amplitude from the unit 65, and such that the signal/noise ratio can be regulated by the algorithm control unit 79.

Figure 6:
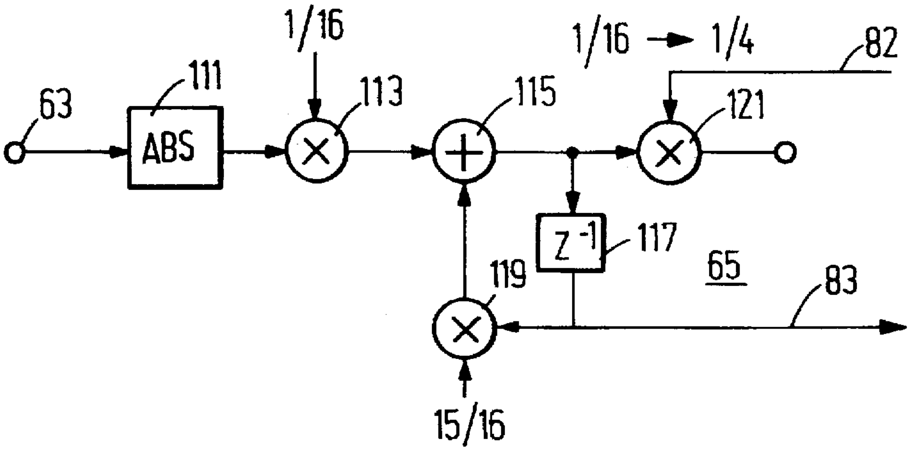

In FIG. 6 it is seen that the input to the unit 65 is taken from point 63 (see FIG. 2) in the connection between point 39 at the input to the correlation circuit and the noise insertion circuit 21. The computation unit 65 has a multi-value output signal which is a function of the level at point 63, and is selected in such a manner that the sum of the desired signal from the limiter circuit 15 and the noise signal added hereto does not exceed the saturation level in any of the components which follow after, especially the summing circuit 21, the D/A converter 19, the output amplifier 9 and the transducer 11.

The recursive filter 65 is of the first order and comprises, as shown in FIG. 6, a first circuit 111 for the measurement of the absolute signal level. This is followed by a first multiplier 113 which produces an output signal which is one sixteenth of the original level, and this signal is fed to an adder 115 which is also supplied with a signal which is delayed one cycle by means of the delay circuit 117 and scaled by fifteen sixteenths by means of a second multiplier 119. The output signal from this part of the first-order recursive filter is hereby scaled by a certain factor, e.g. between one quarter and one sixteenth. Here it can be mentioned that the circuit is arranged as shown in the applicant's earlier European application no. 90309342.5. The circuit is coupled to the algorithm control unit via the leads 82 and 83, so that the signal/noise ratio can be set by the algorithm control unit 79.

Figure 3:
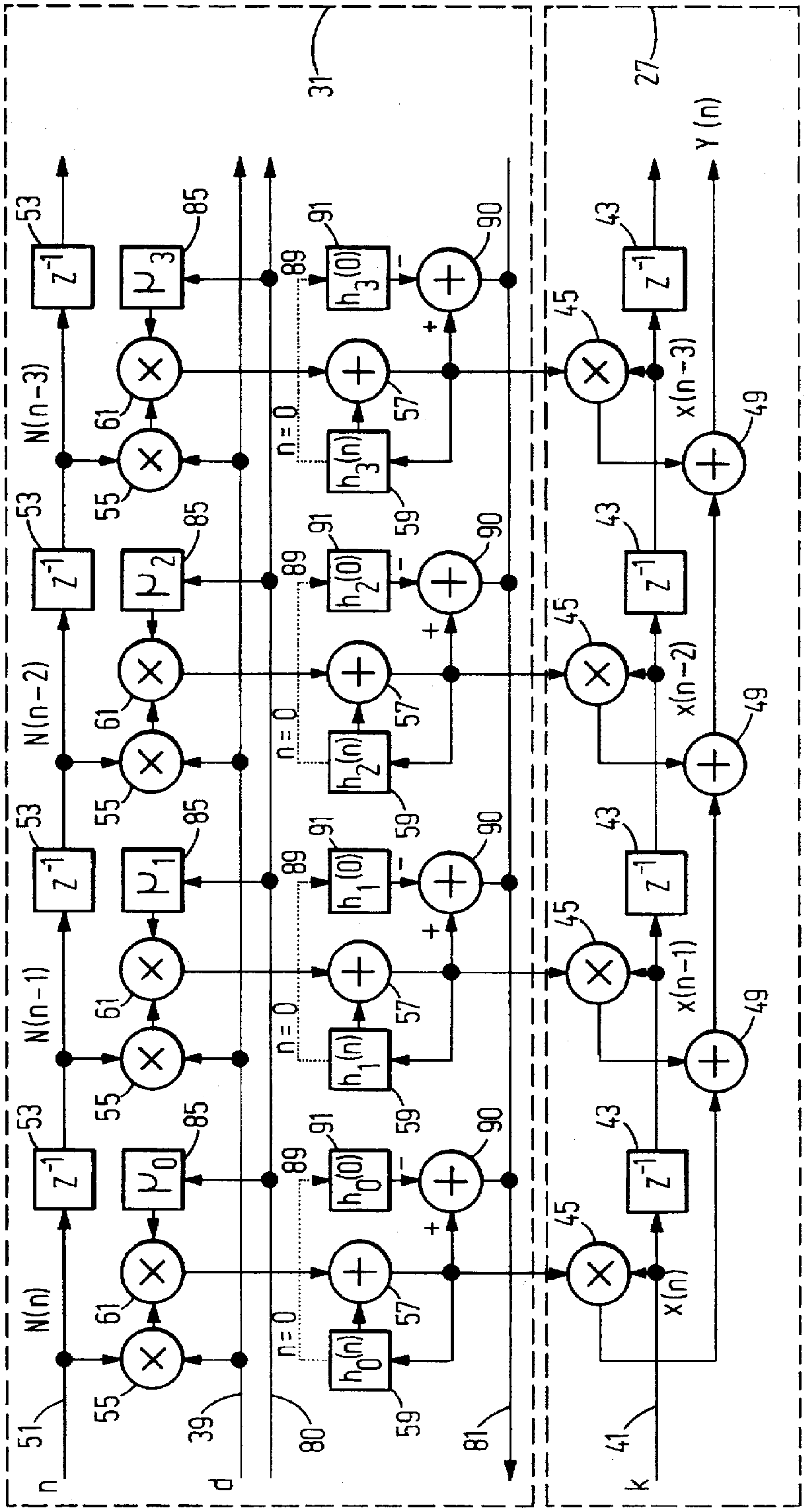

The correlation circuit 31 and the FIR filter 27 are shown in detail in FIG. 3 of the drawing. The FIR filter 27 is a standard digital filter of the type which comprises a delay line 41, a first multiplication amplifier 45 in front of the first delay stage 43, and a further multiplier 45 after each delay stage. All of the multipliers 45, each with its digital summing circuit 49, are connected in parallel.

The digital signal on the delay line k thus passes a number of delay stages 43 in order to produce a series of sequential signal samples x(n), x(n−1), x(n−2) . . . etc., where x(n) is the latest digital example of the signal. Each sample is delayed one period controlled by the master clock which controls the A/D converter 17 and the D/A converter 19. It is typical for an all-in-the-ear aid for the upper frequency limit to be in the order of 7 kHz. This requires that the frequency of the master clock must be at least 14 kHz, and in practice at least 20 kHz. For behind-the ear aids, the bandwidth in most cases is a little lower, so a lower master clock frequency in the order of 10 kHz will be adequate. A master clock oscillator including a controllable capacitor filter can be used, and can be preset to produce a master clock frequency of either 10 kHz or 20 kHz. Here it can be mentioned that the FIR filter 27 is arranged in a manner corresponding to the FIR filter in the applicant's earlier European application no. 90309342.5.

The filter functions as follows:

$$y(n) = \sum_{m=0}^{N-1} [h(m) * x(n-m)]$$

In this expression, each of the coefficients h(m) is updated on each cycle of the master clock and a new output signal y(n) is calculated. Adaption is effected by a controlled adjustment of the value of the coefficient h(m). A correlation circuit 31 for this purpose is also shown in FIG. 3. The correlator 31 is designed to adapt the filter 27 in accordance with the Widrow-Hoff algorithm (B. Widrow et al "Stationary and non-stationary learning characteristics of the LMS adaptive filter", Proc. IEEE volume 24 pages 1161–1162, August 1976). Each coefficient h(m) is adjusted every cycle, in that the adjustment is effected by increasing or decreasing the value of the coefficient, i.e. its magnitude and sign, which is carried out by the correlator 31. Each coefficient h(m) is stored independently in its own accumulator 59.

The correlator 31 comprises a delay line 51 with a number of single-bit delay stages 53. The number of stages corresponds to the number of stages 43 in the FIR filter 27. The input signal to the delay line 51 and the output signal from each delay stage 53 are coupled to the reference input of a digital multiplier stage 55. The second input to each multiplier stage 55 is coupled to a common set of digital leads 39. The delay line 51 is coupled so that it receives the noise signal N from the noise source 33 and the delay line 37, while the common set of digital leads 39 is connected to d in order to receive the residual signal. The output of each multiplier stage 55 is coupled to an adaptation-scale factor circuit 61, which via a summing circuit 57 feeds the signal to the coefficient accumulator 59. Here it can be mentioned that the circuit is arranged as explained in the applicant's earlier European application no. 90309342.5. In addition, the coefficient registers 91 are introduced. At the time n=0, all of the coefficients are copied via the lead 89 over to their copy registers 91. The difference between the copy and the actual value of the coefficient is measured via the summing circuit 90, and this difference is sent via the lead 81 to the algorithm control unit 79. Via the lead 80 from the algorithm control unit 79, the magnitude of the updating of the individual coefficients is controlled on the basis of parameters which are fed into the algorithm control unit 79 and as explained in the following.

In order to be sure that the hearing aid with built-in digital feedback does not begin to oscillate of its own accord, it must be ensured that the updating in the correlation circuit 31 is effected on the basis of an algorithm which takes into consideration that errors in the filter depend upon:

The number of coefficients, signal/noise ratio, input level, the volume and the extent to which the signal is peak clipped. This can be expressed in the following equation:

$$\mu = \frac{k}{E(s) \cdot S/N \cdot \mathrm{vol} \cdot (L-1)^2}$$

where,

E(s) is the influence of the input amplitude,

S/N is the influence of the signal/noise ratio, vol is the influence of the volume, $(L-1)^2$ is the influence of the coefficient number, and where the influence of the peak-clip level is effected via the S/N ratio, in that $$S/N = \frac{E(s) \cdot \mathrm{vol}}{E(\mathrm{noise})}$$

k is a constant,

E(noise) is the amplitude of the noise signal.

Such an algorithm can be characterized as being an algorithm which provides a statistically reliable updating of the filter when the external feedback is constant.

A hearing aid with such an algorithm will not be particularly quick to adapt itself to changes in the feedback path. However, since the statistical probability of changes in the coefficients in the filter is known, i.e. when variations take place in the number of filter coefficients which are undergoing change, it can hereby be ascertained when there is a significant change in the feedback path. For example, if it is determined that a significant change in the feedback path is involved when the coefficients in the filter exceed 4×the standard deviation, a significant change has occurred in the acoustic feedback path. As soon as the algorithm control circuit 79 determines such a change, the circuit reacts by accelerating the adaptation, in that the insertion of more noise is ordered via the lead 82 and/or in another manner, e.g. by making μ greater, an increased adaptation rate is ordered, whereby the adaptation circuit quickly brings the FIR filter to a state in which full compensation is achieved for the changes in the acoustic feedback path. As soon as the algorithm control circuit 79 determines that the coefficients are stable again, the noise level or the μ-value is reduced and the feedback circuit again operates in accordance with the safe algorithm.

A hearing aid with such a "double algorithm" will be capable of reacting considerably more quickly than the known aid according to the applicant's earlier European patent application no. 90309342.5, also even if 6 dB less noise is added in the statistically safe state, so that possible influence on the user comfort can be further reduced.

The hearing aid will function in a corresponding manner also if it is arranged to choose between more than two algorithms, merely providing that criteria are introduced into the circuit which determine under which conditions a decoupling takes place from the basic algorithm to one of the alternative algorithms.

I claim:

1. A hearing aid with electronic feedback compensation, comprising:

a microphone to generate an analog input signal;

an analog-to-digital converter to convert the analog input signal to a microphone digital signal;

a digital filter to add a digital compensating signal to the microphone digital signal so as to produce a compensated microphone digital signal;

a volume control to regulate amplitude of the compensated microphone digital signal;

a limiter to limit the compensated microphone digital signal below a predetermined level;

a digital noise generator to generate a digital noise signal, the digital noise signal being added to the limited compensated microphone digital signal to produce a composite digital signal;

a digital-to-analog converter to convert the composite digital signal to an analog output signal;

an amplifier to amplify the analog output signal;

a transducer to transmit the amplified analog output signal;

a digital circuit, responsive to the volume control, the compensated digital microphone signal, the digital noise signal and filter coefficients of the digital filter, to control the amplitude of the digital noise signal and the filter coefficients of the digital filter; and a correlation circuit controlled by the digital circuit so as to feed the filter coefficients to the digital filter and the digital circuit.

2. The hearing aid according to claim 1, wherein the digital circuit is adapted to carry out a statistical evaluation of the filter coefficients by monitoring all filter coefficients being changed.

3. A hearing aid in which acoustic feedback between a transducer and a microphone is compensated for electronically by means of an electrical feedback signal produced using an adjustable digital filter having filter coefficients adjustable in accordance with the actual acoustic feedback, and where a microphone signal is converted to a digital microphone signal and where a digital compensation signal is added to the digital microphone signal to form a composite signal, the composite signal passing an amplitude-limiting circuit adapted to prevent the transducer from entering a non-linear range, after which the composite signal is added to a digital noise signal and is fed to a digital-analogue converter from where a resulting analogue signal is fed to the transducer via an amplifier, and also where the hearing aid comprises a digital circuit responsive to a hearing aid volume setting and to the amplitude of the digital noise signal added to the composite signal, the digital circuit controlling amplitude of the noise signal and monitoring and controlling updating of the filter coefficients in the digital filter, in accordance with one of two or more different functions, wherein at least a first function effects the updating more quickly than a second function or other functions, and the digital circuit is arranged to control the changeover of the function which updates the digital filter on the basis of a statistical evaluation of the filter coefficients and is carried out by a correlation circuit, the digital filter is controlled by the correlation circuit and the digital circuit controls the correlation circuit, the correlation circuit supplying the digital filter with the filter coefficients.

4. The hearing aid according to claim 1, wherein the digital circuit is arranged to carry out the statistical evaluation on the basis of the monitoring of all filter coefficients of the adjustable digital filter currently being changed.

* * * * *

UNITED STATES PATENT AND TRADEMARK OFFICE

CERTIFICATE OF CORRECTION

PATENT NO. : 5,680,467

DATED : OCTOBER 21, 1997

INVENTOR(S) : HANSEN

It is certified that error appears in the above-identified patent and that said Letters Patent is hereby corrected as shown below:

Col. 3, line 59: insert --25-- after the word "tap"

Col. 6, lines 61-63: "$y(n)=\sum_{m=0}^{N-1}[h(m)*x(n-m)]$" should read -- $y(n)=\sum_{m=0}^{n-1}[h(m)*x(n-m)]$ Signed and Sealed this Twenty-third Day of February, 1999

Attest:

Q. TODD DICKINSON

*Attesting Officer* *Acting Commissioner of Patents and Trademarks*